2,927,117

PRODUCTION OF 3-INDOLEACETONITRILE FROM INDOLE

Owen B. Mathre, Wilmington, Del., assignor to E. I. du Pont de Nemours and Company, Wilmington, Del., a corporation of Delaware No Drawing. Application July 30, 1958
Serial No. 751,874

8 Claims. (Cl. 260—319)

This invention relates to the production of 3-indoleacetonitrile and is more particularly concerned with a process for producing it directly from indole.

3-indoleacetonitrile is known to be valuable as a plant growth promoter and for synthesizing other useful products. It has been parepared from indole in two steps by first reacting indole with formaldehyde and dimethylamine to form 3-dimethylaminomethylindole (gramine) and then reacting this with anhydrous hydrogen cyanide in the presence of an inert diluent or solvent as disclosed by Salzer and Andersag in U.S. Patent No. 2,315,661 of April 6, 1943. 3-indoleacetonitrile is readily hydrolyzed to 3-indoleacetic acid, and the above patent discloses that the reaction of gramine with aqueous alkali metal cyanide gives 3-indoleacetic acid because the 3-indoleacetonitrile formed is simultaneously converted to 3-indoleacetic acid by the alkaline reaction of the mixture. In order to avoid such hydrolysis the nitrile must be formed under non-alkaline conditions, as by reaction with hydrogen cyanide under substantially anhydrous conditions.

Cyanomethylation of indole to give 3-indoleacetonitrile directly in a single step would be preferable. Treatment of indole with a solution of formaldehyde and sodium or potassium cyanide has been proposed for producing 3-indoleacetonitrile but, since alkali hydroxide is also produced in this reaction, it has been found that the nitrile is hydrolyzed substantially as fast as it is formed to give 3-indoleacetic acid as the principal product. Attempts to carry out the reaction under non-alkaline conditions have not been successful. In neutral or acidic solution the reaction has been found to be predominantly between indole and formaldehyde to give 3,3'-diindolylmethane. Attempts to avoid objectionable alkalinity in the reaction mixture by using less alkaline cyanides, such as zinc or cuprous cyanide, in place of alkali cyanide gave no cyanomethylation products; similarly, attempts to buffer the alkaline reaction of alkali cyanide with magnesium acetate or alumina or aluminum acetate gave only unreacted indole or polymerization products.

It is an object of this invention to provide a process of cyanomethylation of indole to form 3-indoleacetonitrile without appreciable hydrolysis to 3-indoleacetic acid. Other objects will become apparent from the specification and claims.

In the process of the present invention the above objects are accomplished by reacting indole with alkali metal cyanide and aqueous formaldehyde in the presence of dialkali phosphate at pH 9.5 to 11.5 to form 3-indoleacetonitrile and separating the indoleacetonitrile from the resulting mixture. The process gives a high yield of 3-indoleacetonitrile in comparison with other reaction products. Substantially no hydrolysis to 3-indoleacetic acid occurs under these conditions. Unreacted indole is readily recovered for retreatment.

Water-miscible inert liquid diluents may be included in the reaction mixture. Mixtures of water and lower alcohols are particularly suitable because of their cheapness and ease of recovery after the reaction. The reaction is usually carried out by heating to 120°–200° C. under autogenous pressure, as in an autoclave, but greater pressures can be used. It is preferable to produce 3-indoleacetonitrile at about 150° C., although considerable variation gives satisfactory results. Under these conditions, a reaction time of 1 to 4 hours is sufficient.

The 3-indoleacetonitrile is readily recovered by filtering the resulting mixture, evaporating the water and any alcohol or other diluent, and then distilling the oily residue under vacuum. Unreacted indole boils at 90°–115° C. under 0.1–0.4 millimeter of mercury pressure and 3-indoleacetonitrile boils at 160°–195° C. under 0.2–0.5 mm. pressure, to separation is readily accomplished. The product is readily distinguished from 3,3'-diindolylmethane (melting point 165–167° C.) and 3-indoleacetic acid (M.P. 164–167° C.), which boil above 225° C. at this pressure.

The following example, in which parts are by weight, illustrates a preferred embodiment of the invention:

Example

A mixture of 39 parts indole, 22 parts potassium cyanide, 85 parts dipotassium phosphate trihydrate, 30 parts of a 36.2% aqueous solution of formaldehyde, 79 parts ethanol and 100 parts water are heated at 150° C. for 4 hours in a reactor under autogenous pressure. The mixture is cooled, discharged and filtered. The solvent is evaporated from the filtrate and the oily residue is distilled at 0.1–0.3 mm. of mercury pressure to recover the unreacted indole at 90°–110° C. and 3-indoleacetonitrile at 160°–180° C. There is obtained in this way 3.4 parts of substantially pure 3-indoleacetonitrile. The melting point of its trinitrobenzene adduct is 139°–141° C. and there is no depression of the melting point when mix-melted with an authentic sample of this derivative.

A major part of the indole which is not converted to 3-indoleacetonitrile is recovered unchanged and is suitable for reuse in the process without further treatment. Although the conversion in a single treatment is low, repression of by-product formation in the process provides for production of 3-indoleacetonitrile in good overall yields based on reacted indole.

The reactants are conveniently used in substantially equimolar proportions, as in the above example, but a variety of proportions are suitable as in other cyanomethylation reactions. The dialkali phosphate should be present in sufficient amount to maintain the pH within the range of 9.5 to 11.5 during the reaction, but its action may also be catalytic.

Attempts to produce 3-indoleacetonitrile without dialkali phosphate present were unsuccessful. When the dipotassium phosphate of the above example was replaced by 6 parts alumina and 5 parts potassium acetate, the products were 3-indoleacetic acid (55% yield), 3,3'-diindolylmethane (20% yield) and a small amount of unreacted indole, but there was no 3-indoleacetonitrile. Substitution of 20 parts aluminum hydroxide and 6 parts potassium acetate gave similar results. Heating as above 39 parts indole in an aqueous solution of 10.8 parts formaldehyde, 20 parts hydrogen cyanide and 2.3 parts potassium cyanide in the presence of alumina gave resinous products, a small amount of unreacted indole and no 3-indoleacetonitrile. Heating 11.7 parts indole in an aqueous solution of 7 parts formaldehyde and 11.7 parts zinc cyanide or 8.7 parts cuprous cyanide, the solution being made slightly alkaline with ammonia, produced no 3-indoleacetonitrile and most of the indole was recovered unchanged. Similar unsuccessful results were obtained when magnesium acetate was substituted for dipotassium phosphate in the above example.

Since many different embodiments of the invention

I claim:

1. In the cyanomethylation of indole with aqueous formaldehyde and alkali metal cyanide, the improvement for recovering 3-indoleacetonitrile from the process which comprises reacting indole with alkali metal cyanide and aqueous formaldehyde in the presence of dialkali phosphate at pH 9.5 to 11.5 to form 3-indoleacetonitrile and separating the indoleacetonitrile from the resulting mixture.

2. A process as defined in claim 1 wherein the indole is reacted with the alkali metal cyanide and formaldehyde in a mixture of water and water-miscible inert liquid diluent.

3. A process as defined in claim 1 wherein the indole is reacted with the alkali metal cyanide and formaldehyde by heating to 120°–200° C. under pressure.

4. In the cyanomethylation of indole with aqueous formaldehyde and alkali metal cyanide, the improvement for recovering 3-indoleacetonitrile from the process which comprises heating indole with alkali metal cyanide, formaldehyde and dialkali phosphate in a mixture of water and a lower alcohol at 120°–200° C. under pressure to form 3-indoleacetonitrile, said dialkali phosphate being present in sufficient amount to maintain the pH within the range of 9.5 to 11.5, and then separating the 3-indoleacetonitrile from the resulting mixture.

5. A process as defined in claim 4 wherein the indole, alkali metal cyanide and formaldehyde are used in substantially equimolar proportions.

6. A process as defined in claim 4 wherein 3-indoleacetonitrile is produced at about 150° C.

7. A process as defined in claim 4 wherein said heating is under autogenous pressure.

8. In the cyanomethylation of indole with aqueous formaldehyde and alkali metal cyanide, the improvement for recovering 3-indoleacetonitrile from the process which comprises heating substantially equimolar proportions of indole, alkali metal cyanide, formaldehyde and dialkali phosphate in water-alcohol solution at about 150° C. to form 3-indoleacetonitrile and separating the indoleacetonitrile from the resulting mixture.

References Cited in the file of this patent

UNITED STATES PATENTS

| | | |
|---|---|---|
| 2,222,344 | Baur et al. | Nov. 19, 1940 |
| 2,715,129 | Hamlin | Aug. 9, 1955 |